United States Patent
Satish et al.

(10) Patent No.: US 7,886,065 B1
(45) Date of Patent: Feb. 8, 2011

(54) DETECTING REBOOT EVENTS TO ENABLE NAC REASSESSMENT

(75) Inventors: Sourabh Satish, Fremont, CA (US); Brian Hernacki, San Carlos, CA (US)

(73) Assignee: Symantec Corporation, Mountain View, CA (US)

(*) Notice: Subject to any disclaimer, the term of this patent is extended or adjusted under 35 U.S.C. 154(b) by 430 days.

(21) Appl. No.: 11/391,979

(22) Filed: Mar. 28, 2006

(51) Int. Cl.
| | |
|---|---|
| G06F 15/16 | (2006.01) |
| G06F 15/173 | (2006.01) |
| G06F 9/00 | (2006.01) |
| G06F 12/14 | (2006.01) |
| G06F 11/30 | (2006.01) |
| H04L 29/06 | (2006.01) |
| H04L 12/66 | (2006.01) |

(52) U.S. Cl. ............... 709/229; 709/227; 709/224; 709/226; 713/1; 713/2; 713/188; 713/156; 713/150; 713/193; 370/352

(58) Field of Classification Search ............ None
See application file for complete search history.

(56) References Cited

U.S. PATENT DOCUMENTS

| | | | | |
|---|---|---|---|---|
| 5,919,257 A | * | 7/1999 | Trostle | 726/22 |
| 2002/0120737 A1 | * | 8/2002 | Martin et al. | 709/224 |
| 2002/0161889 A1 | * | 10/2002 | Gamache et al. | 709/226 |
| 2003/0009657 A1 | * | 1/2003 | French et al. | 713/2 |
| 2004/0078537 A1 | * | 4/2004 | Fulghum | 711/165 |
| 2005/0065935 A1 | * | 3/2005 | Chebolu et al. | 707/9 |
| 2005/0132179 A1 | * | 6/2005 | Glaum et al. | 713/1 |
| 2005/0216718 A1 | * | 9/2005 | Rao | 713/1 |
| 2006/0064619 A1 | * | 3/2006 | Wen et al. | 714/734 |
| 2006/0089954 A1 | * | 4/2006 | Anschutz | 707/202 |
| 2006/0090196 A1 | * | 4/2006 | van Bemmel et al. | 726/4 |
| 2007/0067615 A1 | * | 3/2007 | Wang | 713/1 |
| 2007/0113062 A1 | * | 5/2007 | Osburn et al. | 713/1 |
| 2009/0217377 A1 | * | 8/2009 | Arbaugh et al. | 726/23 |

* cited by examiner

*Primary Examiner*—Moustafa M Meky
*Assistant Examiner*—Ho Shiu
(74) *Attorney, Agent, or Firm*—Hunton & Williams LLP

(57) ABSTRACT

Providing security for a network is disclosed. Network traffic associated with a host is monitored. If an activity pattern associated with a reboot of the host is observed, access by the host to the network is restricted based at least in part on the observed activity pattern.

17 Claims, 4 Drawing Sheets

DETECTING REBOOT EVENTS TO ENABLE NAC REASSESSMENT

BACKGROUND OF THE INVENTION

Network admission control servers ("NAC servers") typically base their determination of whether to allow a client to join a network on whether the client is up-to-date with patches and security definitions. In some cases, NAC servers may also require authentication, such as by requiring a user to enter in a username and password before being granted access to a network. If the client is not up-to-date, the NAC may require the client to join a remediation network where the appropriate patches and definitions can be applied. Once the client is up-to-date, the client is admitted to the network.

Once admitted to the network, however, the client's security posture (e.g., factors upon which admission was granted) may change. Actions taken by a user, such as downloading and installing software, modifying the registry, and so on, may put a system admitted previously to the network into a state in which admission would have been denied. There are also many forms of malicious software/code, sometimes referred to as "malware," that exploit unknown vulnerabilities, system misconfigurations, third party software, and so on, which may make changes to an admitted system. In each of these cases, a client may be admitted to the enterprise network by a typical network admission control server, and remain admitted once circumstances have changed, despite the significant risk that the client potentially poses by virtue of changes on the client subsequent to its being admitted to the network.

Therefore, it would be desirable to have a better way to make and reassess network admission decisions.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
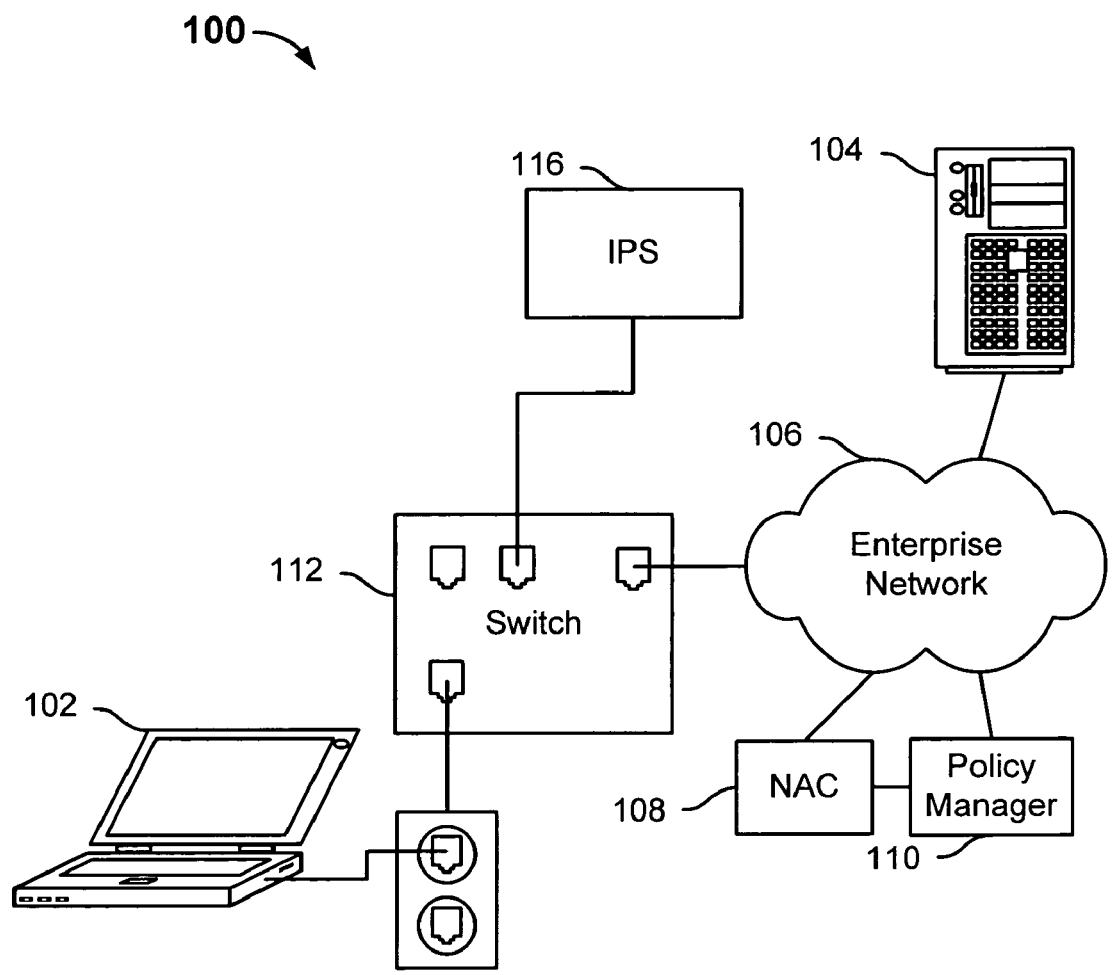
FIG. 1 is a diagram illustrating an embodiment of a system having network admission control.

FIG. 1 is a diagram illustrating an embodiment of a system having network admission control. System 100 includes at least one client 102, and other nodes, such as server 104, that are connected to a network, such as enterprise network 106. In the example shown, client 102 is an employee laptop, routinely connected and disconnected from enterprise network 106 by being plugged and unplugged from a wall plate leading to switch 112. Client 102 may also be one of a variety of other devices, such as a workstation, tablet, PDA, or other computing platform, as applicable.

When the employee attempts to connect client 102 to enterprise network 106, for example, upon return to the office at the beginning of a workday, network admission control server (hereinafter "NAC") 108 consults policy manager 110 to determine whether client 102 may access all or part of enterprise network 106, and whether any remediation is required.

When a user installs new software or makes a significant configuration change, the client is often rebooted. These changes can also be the result of malware, which also often causes system crashes and triggers reboots. As described in more detail below, by monitoring client 102 for events that indicate that client 102 has been rebooted, an ongoing decision about whether client 102 should be reassessed for continued admission to the network can be made. Reboot detection may be implemented in switch 112, and/or may be implemented in optional intrusion prevention system (hereinafter "IPS") 116 as appropriate. In some embodiments, passive monitoring from the vantage point of a node such as switch 112 and/or IPS 116 enables a reboot event to be detected without requiring that an agent be installed and properly configured on client 102 to provide a reboot indication. Not requiring such an agent simplifies administration (e.g., configuring and maintaining an agent on each client) and enables the reboot detection monitoring to be performed with respect to clients new to the network and not specially configured to connect to the network. Not using a client may also be more secure, in that if reboot detection depended on an agent on the client, malware and/or a hacker might disable and/or interfere with operation of the agent, enabling the client to be rebooted without detection.

In some cases, the functionality of NAC 108 and policy manager 110 may be combined in a single device, and may perform additional tasks such as intrusion detection. In the example shown, NAC 108 has a direct connection to policy manager 110, but in other embodiments NAC 108 and policy manager 110 do not have a direct connection and instead communicate via enterprise network 106. Policy manager 110 typically holds configurable security policies for a variety of devices and circumstances, such as a mandatory minimum patch level, maximum length of time between virus scans, password characteristics, and so on. In some embodiments, policy manager 110 holds additional and/or different data to support reboot detection, such as reboot signatures and/or fingerprints for different hosts or types of hosts that connect to enterprise network 106, and/or one or more policies that indicate a responsive action to be taken in the event a reboot event is detected with respect to a client subsequent to the client being admitted to the network 106.

Typically, a system such as system 100 includes a variety of security protections not shown in FIG. 1. For example, firewalls, intrusion detection systems, and other monitors (not shown) are in place to verify that client 102 and the traffic it sends and receives do not pose a security risk. If it is determined that client 102 poses a threat and/or requires reassessment, alerts can be generated and, for example, delivered to an administrator, as appropriate.

Figure 2:
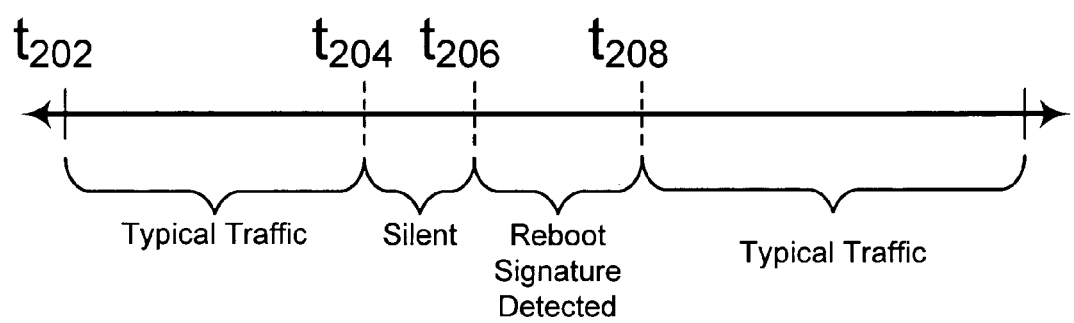
FIG. 2 is a timeline representation of a sample of a client's activity.

FIG. 2 is a timeline representation of a sample of a client's activity. At time $t_{202}$, (in this case the beginning of a workday), an employee brought a laptop to work and connected it to switch 112. In the example shown, client 102 connects to a DHCP server, requesting an IP address. The DHCP server contacts NAC 108. NAC 108 performs typical configuration validation and/or authentication, such as checking the patch level of client 102 and requesting a password from the employee. The DHCP server is notified whether to assign an IP address, and if so, whether to grant full access to the enterprise, or to a limited view of the network. In other cases, client 102 may have a static IP address and/or may have its initial admission determination made at least in part through use of an agent or other components. As described in more detail below, typically, admission status is tied to a "MAC/port pair"—a physical port on switch 112 and client 102's MAC address.

After being approved by NAC 108, client 102 is admitted to the network and proceeds to conduct typical work-related network traffic (represented by the interval between times $t_{202}$ and $t_{204}$). For example, during this time period, the employee opens and uses an email client and a web browser, and fetches shared files such as from server 104.

At time $t_{204}$, client 102 ceased network activity. The silence (indicated by the interval between times $t_{204}$ and $t_{206}$) is detected in this example by switch 112. Other configurations may also be used as applicable.

Client 102 may have ceased network activity because the employee has inadvertently unplugged the laptop from the network, or decided to power off the laptop before heading to lunch. The employee may also have decided to focus on an important task by closing all distractions (e.g., email, browser). In these cases, no change in the client's security posture has been made (such as adding or removing software)—the silence is attributable to harmless activity.

A silent period can also indicate that the employee is in the process of rebooting client 102. There is a brief period of silence between when a system shuts down its network interfaces and when it has rebooted far enough to bring them back up. Even when idle, a system is still somewhat "noisy" on the network and thus not likely to trigger this condition accidentally.

When a user installs new software or makes a significant configuration change, the client is often rebooted. These changes can also be the result of malware, which also often causes system crashes and/or triggers reboots. By tracking and detecting when a host reboots, the information can be used to determine if a reassessment is needed. For example, if the employee uninstalls antivirus software and reboots (typically a requirement of making any significant configuration changes), client 102 poses a threat to network 106 and ought to be denied access to the network until the situation can be remedied.

A rogue employee may obtain admission to the network using one operating system (e.g., Linux), and then rely on the access granted to the MAC/port pair to run a different operating system (e.g., Windows). By detecting reboot events (including by detecting changes in operating system), access can be revoked until a reassessment of client 102 can be performed. If a reboot is detected, NAC 108 can be notified, and in some cases, the NAC can be provided with additional information for use in the evaluation.

The interval between times $t_{206}$ and $t_{208}$ indicates that client 102 is (likely) rebooting. As described in more detail below, when a client reboots, it typically emits certain network activity that can be recognized as indicating that a reboot is taking place.

Figure 3:
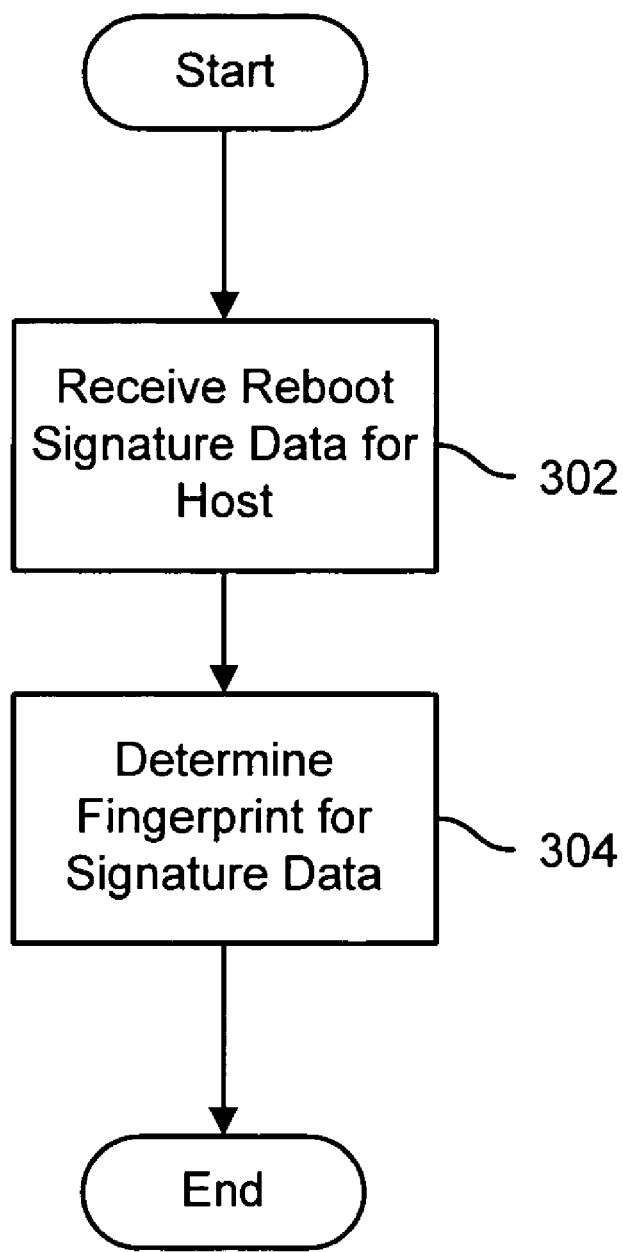
FIG. 3 is a flow chart illustrating an embodiment of a process for configuring a reboot signature detector.

FIG. 3 is a flow chart illustrating an embodiment of a process for configuring a reboot signature detector. For a given operating system, such as Microsoft Windows or OS X, it is possible to determine a predictable span of reboot-related silence and startup services whose behavior can compose fingerprints. For example, a typical PDA may require 30 seconds to reboot, while a standard desktop running Microsoft Windows XP may require an average of two minutes. During the boot processes, both platforms have their own respective applications that typically load and make network access attempts at startup.

Assume client 102 is configured to obtain a dynamic IP address via DHCP upon boot. Client 102 is likely booting or rebooting whenever it is observed reissuing a DHCP request or issuing a new one. Even if client 102 is configured with a static hostname and does not use DHCP, it typically emits other types of traffic at boot time. It may emit certain NetBIOS requests, attempt to discover local file shares, make DNS queries to resolve hostnames related to well-known startup services (e.g., automatic checks for new versions of software and new antivirus definitions), etc.

A variety of hosts can be sampled and sets of services that are common to an operating system, environment, set of applications, etc. can be determined. As these types of activity are observed a reasonable conclusion that a system is rebooting can be reached.

Depending on configuration, the specific length of time a reboot takes, and the specific applications that start may vary widely from host to host—especially across platforms. Additionally, other actions may on occasion appear to resemble portions of startup traffic, such as when an employee manually checks for software updates. Nonetheless, by monitoring for both a silence period and startup activity, false positives will be sufficiently rare that they will not cause a serious impact on the availability of the network.

At 302, reboot signature data for a host is received, and at 304, a signature (or fingerprint) is determined. In some cases, the processing of 302 and 304 is combined. For example, in some embodiments, a manual configuration, such as one or more configuration files, may provide a variety of reboot fingerprints (e.g., for different versions of Windows (98, 200, XP), Mac OS (OS 9, OS X), FreeBSD, Debian, etc.), such as to switch 112.

If fingerprint detection is implemented on switch 112, switch 112 may be configured at the factory with a set of fingerprints which may optionally be updated and/or augmented by an update service, or by an administrator. Similarly, data across switch 112 may be observed and interpreted by IPS 116 which may be configured at the factory with a set of fingerprints.

In some embodiments, fingerprints are collected by observation. For example, when switch 112 is first obtained by an entity, a variety of clients 102 may be connected to it and rebooted during a learning mode. Data is collected at 302, and then processed and stored as representative fingerprints at 304. The fingerprints can take a variety of forms. For example, they may merely be a list of domain names (and/or IP addresses) which, when accessed in rapid succession, indicate that startup is taking place. More complex fingerprints can also be created that take the timing of activity into account. For example, a reboot signature for a client running Linux may specify that after a period of silence, a burst of outgoing SMTP traffic followed by a burst in incoming HTTP traffic followed by a burst in SMB packets indicates that services are starting up in a specific order commensurate with a reboot. In some embodiments, other methods of generating/receiving reboot signatures are employed, individually, or in combination with the above methods.

Figure 4:
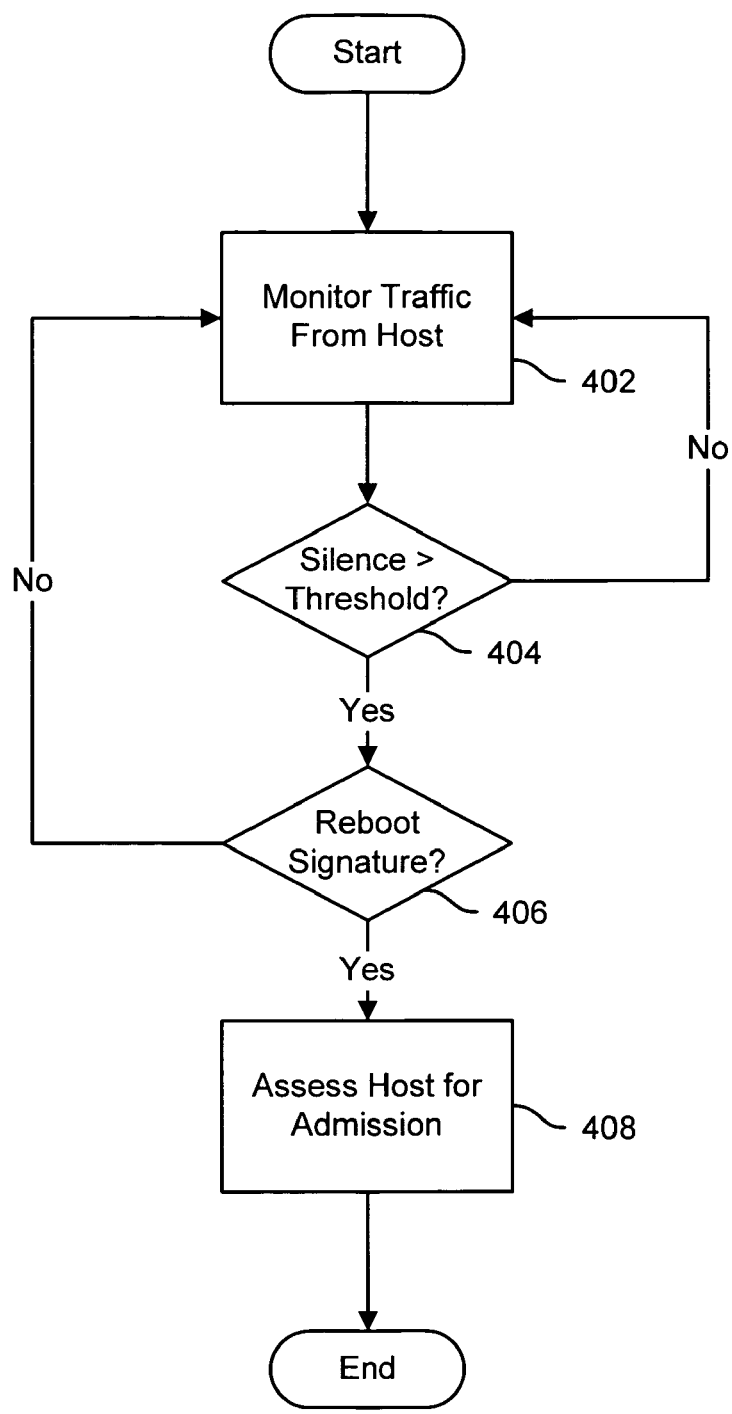
FIG. 4 is a flow chart illustrating an embodiment of a process for determining whether to reassess a client for admission to a network.

FIG. 4 is a flow chart illustrating an embodiment of a process for determining whether to reassess a client for admission to a network.

In the example shown in FIG. 1, in some embodiments the process of FIG. 4 is implemented by switch 112 and NAC 108. At 402 traffic from a host is monitored. In this example, switch 112 evaluates the traffic from client 102, looking for periods of silence and activity which could indicate that a reboot is taking place. In some embodiments, the processing at 402 is performed at least in part by optional IPS 116. Two forms of activity are being monitored for at 402: a period of silence that exceeds a threshold (404), followed (in various embodiments immediately, closely, within a threshold period, within a configurable period, within a period determined by a detected or configured or indicated client host type, etc.) by activity that indicates a reboot is taking place (406).

In some cases, such as in highly secured environments or environments in which clients reboot quickly, it may be desirable to set the silence threshold low (e.g., 30 seconds). By setting the silence threshold low (i.e., making short the interval during which no activity is observed is treated as silence), more false positives may be triggered, and reassessments may be forced unnecessarily. Nonetheless, by combining even short periods of silence with fingerprints, it is possible to limit the number of scans to a manageable number of reassessments. In some alternative embodiments, 404 is omitted and NAC reassessment is triggered if traffic associated with a reboot is detected, even if not preceded by a threshold period of silence.

At 406 it is determined whether a reboot signature is being detected. Depending on the type of fingerprint employed, whether or not a signature is detected may be based on a variety of factors. For example, heuristics may be employed to help efficiently match network traffic to a fingerprint. If a reboot signature is detected, at 408 the client is reassessed for admission to the network.

If necessary, remediation of client 102 can be performed. For example, if the virus definitions on client 102 are out of date, appropriate patches can subsequently be applied. Similarly, if the company has a rule prohibiting the installation of certain pieces of software on clients (e.g., file trading software), if it is determined that such software was installed, the appropriate remediation may be to uninstall that software before readmission to the network.

In some embodiments, at 408, the MAC/port pair permission is rescinded while reassessment is taking place—the client is denied access to the network after reboot until the NAC admits the client. For example, switch 112 may refuse packets from the client until remediation has been performed with respect to the client. In some embodiments, access for a limited period of time, and/or to a limited number of services may be allowed even during the NAC reevaluation process.

In various embodiments, varying levels of access to enterprise network 106 are granted to client 102 during the reassessment period. For example, in some cases a grant of full access to the network may be given pending reassessment, and admission may only be revoked if NAC 108 determines that client 102 actually poses a threat. In other cases, limited access may be granted to client 102 while the reassessment at 408 takes place. For example, to maintain a level of continuity and/or productivity, client 102 may be allowed access to resources such as email, while preventing access to other clients on the network until the reassessment is complete. Other examples of providing limited access include providing access to the Internet only, and not to internal servers; providing access to servers but not to other clients; and other configurations, such as ones making use of one or more virtual LANs.

Depending on the risk level, only a limited set of protocols may be allowed to be used by or with client 102, or client 102 may not be allowed to connect to other clients for a period of time. The rules may also vary from node to node. For example, servers may be instructed to offer limited services to client 102, while other clients may be forbidden from communicating with client 102 at all.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of providing security for a network, comprising:
    observing, in network traffic associated with a client computer admitted previously to the network, an activity pattern indicative of a reboot event comprising a portion of silence followed by at least one activity associated with a reboot of the client computer, wherein observing the activity pattern comprises detecting the at least one activity based at least in part upon a predetermined reboot signature, the predetermined reboot signature comprising a set of reboot-related events that are unique to the computer client;
    assessing a security posture of the client computer in response to the observed activity pattern by determining whether at least one of a software installation, a software removal, a registry modification, and an operating system change has occurred on the client computer after the client computer was admitted to the network;
    restricting access by the client computer to the network in accordance with one or more risk level rules when assessing the security posture, wherein one of the one or more risk level rules comprises only allowing the client computer access to email resources when assessing the security posture of the client computer; and
    revoking the client computer's admission to the network in response to determining that at least one of the software installation, the software removal, the registry modification, and the operating system change has occurred on the client computer after the client computer was admitted to the network.

2. The method of claim 1 wherein the network traffic is observed at a node other than the client computer.

3. The method of claim 1 wherein observing comprises detecting an activity pattern that includes one or more of a NetBIOS request, an attempt to discover a local file share, and a DNS query related to a startup service.

4. The method as recited in claim 1 further comprising generating an alert based at least in part on the activity pattern.

5. The method of claim 1 further comprising receiving one or more reboot fingerprints.

6. The method of claim 1 wherein one of the one or more risk level rules further comprises allowing the client computer access to the internet when assessing the security posture of the client computer.

7. A system for providing security for a network, comprising:
   a processor, configured to:
      observe, in network traffic associated with a client computer admitted previously to the network, an activity pattern indicative of a reboot event comprising a portion of silence followed by at least one activity associated with a reboot of the client computer, wherein observing the activity pattern comprises detecting the at least one activity based at least in part upon a predetermined reboot signature, the predetermined reboot signature comprising a set of reboot-related events that are unique to the computer client;
      assess a security posture of the client computer in response to the observed activity pattern by determining whether at least one of a software installation, a software removal, a registry modification, and an operating system change has occurred on the client computer after the client computer was admitted to the network;
      restrict access by the client computer to the network in accordance with one or more risk level rules when assessing the security posture, wherein one of the one or more risk level rules comprises only allowing the client computer access to email resources when assessing the security posture of the client computer; and
      revoke the client computer's admission to the network in response to determining that at least one of the software installation, the software removal, the registry modification, and the operating system change has occurred on the client computer after the client computer was admitted to the network; and
   a memory, coupled to the processor, configured to provide the processor with instructions.

8. The system of claim 7 wherein the processor is included in a network switch.

9. The system of claim 7 wherein the processor is configured to observe by detecting an activity pattern that includes one or more of a NetBIOS request, an attempt to discover local file share, and a DNS query related to a startup service.

10. The system of claim 7 wherein the processor is further configured to generate an alert based at least in part on the activity pattern.

11. The system of claim 7 wherein the processor is further configured to receive one or more reboot fingerprints.

12. The system of claim 7 wherein one of the one or more risk level rules further comprises allowing the client computer access to the internet when assessing the security posture of the client computer.

13. A computer program product for providing security for a network, the computer program product being embodied in a non-transitory computer readable storage medium and comprising computer instructions for:
   monitoring network traffic associated with a client computer;
   observing in the network traffic an activity pattern indicative of a reboot event comprising a portion of silence followed by at least one activity associated with a reboot of the client computer, wherein observing the activity pattern comprises detecting the at least one activity based at least in part upon a predetermined reboot signature, the predetermined reboot signature comprising a set of reboot-related events that are unique to the computer client;
   assessing a security posture of the client computer in response to the observed activity pattern by determining whether at least one of a software installation, a software removal, a registry modification, and an operating system change has occurred on the client computer after the client computer was admitted to the network;
   restricting access by the client computer to the network in accordance with one or more risk level rules when assessing the security posture, wherein one of the one or more risk level rules comprises only allowing the client computer access to email resources when assessing the security posture of the client computer; and
   revoking the client computer's admission to the network in response to determining that at least one of the software installation, the software removal, the registry modification, and the operating system change has occurred on the client computer after the client computer was admitted to the network.

14. The computer program product as recited in claim 13, wherein observing comprises detecting an activity pattern that includes one or more of a NetBIOS request, an attempt to discover local file share, and a DNS query related to a startup service.

15. The computer program product as recited in claim 13, the computer program product further comprising computer instructions for generating an alert based at least in part on the activity pattern.

16. The computer program product as recited in claim 13, the computer program product further comprising computer instructions for receiving one or more reboot fingerprints.

17. The computer program product as recited in claim 13, wherein one of the one or more risk level rules further comprises allowing the client computer access to the internet when assessing the security posture of the client computer.

* * * * *